United States Patent
Hanlon et al.

(10) Patent No.: US 12,268,298 B2
(45) Date of Patent: Apr. 8, 2025

(54) INDUSTRIAL RACK

(71) Applicant: HANGZHOU GREAT STAR INDUSTRIAL CO., LTD., Hangzhou (CN)

(72) Inventors: Jared Hanlon, Las Vegas, NV (US); Weiyi Wang, Hangzhou (CN)

(73) Assignee: HANGZHOU GREAT STAR INDUSTRIAL CO., LTD., Hangzhou (CN)

( * ) Notice: Subject to any disclaimer, the term of this patent is extended or adjusted under 35 U.S.C. 154(b) by 0 days.

(21) Appl. No.: 18/258,686

(22) PCT Filed: May 13, 2021

(86) PCT No.: PCT/CN2021/093620
§ 371 (c)(1),
(2) Date: Jun. 21, 2023

(87) PCT Pub. No.: WO2021/228199
PCT Pub. Date: Nov. 18, 2021

(65) Prior Publication Data
US 2024/0041202 A1     Feb. 8, 2024

Related U.S. Application Data

(60) Provisional application No. 63/054,038, filed on Jul. 20, 2020, provisional application No. 63/025,071, filed on May 14, 2020.

(51) Int. Cl.
*A47B 47/02*     (2006.01)
*A47B 47/00*     (2006.01)
(Continued)

(52) U.S. Cl.
CPC .......... *A47B 47/027* (2013.01); *A47B 47/021* (2013.01); *A47B 47/028* (2013.01);
(Continued)

(58) Field of Classification Search
CPC ... A47B 47/027; A47B 47/028; A47B 47/021; A47B 47/00; A47B 47/02;
(Continued)

(56) References Cited

U.S. PATENT DOCUMENTS

| | | | | |
|---|---|---|---|---|
| 2,319,470 | A | * | 5/1943 | Nobles .................... F25D 25/02 211/153 |
| 2,398,153 | A | * | 4/1946 | Nielsen .................. A47B 57/40 211/182 |

(Continued)

FOREIGN PATENT DOCUMENTS

| | | |
|---|---|---|
| CN | 201727198 U | 2/2011 |
| CN | 104510179 A | 4/2015 |

(Continued)

OTHER PUBLICATIONS

International Search Report for PCT Application No. PCT/CN2021/093620, mailed Jul. 30, 2021.

*Primary Examiner* — Devin K Barnett
(74) *Attorney, Agent, or Firm* — BLANK ROME LLP

(57) ABSTRACT

An industrial rack apparatus includes upright support members, at least one pair of shelf beams that are supported by the upright support member, at least one shelf connected to one pair of the at least a pair of shelf beams; wherein one pair of the upright support members is positioned at one end of the rack apparatus, and the other pair of the upright support member is positioned at the opposite end of the rack apparatus; wherein each shelf beam of the at least one shelf beams is attached to two opposed upright members of the upright support members.

16 Claims, 16 Drawing Sheets

(51) Int. Cl.
*A47B 57/06* (2006.01)
*A47B 57/20* (2006.01)

(52) U.S. Cl.
CPC ........... *A47B 47/00* (2013.01); *A47B 47/0083* (2013.01); *A47B 57/06* (2013.01); *A47B 57/20* (2013.01)

(58) Field of Classification Search
CPC ..... A47B 47/0083; A47B 57/00; A47B 57/50; A47B 57/402; A47B 57/487; A47B 57/40; A47B 57/06; A47B 57/20
See application file for complete search history.

(56) References Cited

U.S. PATENT DOCUMENTS

| | | | | |
|---|---|---|---|---|
| 3,009,582 | A * | 11/1961 | Degener | A47B 57/402 211/134 |
| 3,285,428 | A * | 11/1966 | Scheck | A47B 57/06 52/666 |
| 3,388,809 | A * | 6/1968 | Irish | A47B 61/003 248/245 |
| 3,469,813 | A * | 9/1969 | Rizzi | G09F 3/20 248/475.1 |
| 3,664,513 | A * | 5/1972 | Atwater | B65G 1/02 52/653.1 |
| 3,685,665 | A * | 8/1972 | Atwater | A47B 55/00 52/655.1 |
| 3,763,794 | A * | 10/1973 | Fleck | A47B 55/02 248/231.61 |
| 4,078,664 | A * | 3/1978 | McConnell | A47B 96/00 211/187 |
| 4,558,647 | A | 12/1985 | Petersen | |
| 4,646,658 | A * | 3/1987 | Lee | A47B 96/025 108/62 |
| 4,708,252 | A * | 11/1987 | Azzi | A47B 57/402 52/646 |
| 4,955,490 | A | 9/1990 | Schafer | |
| 5,012,938 | A * | 5/1991 | King | A47B 57/18 211/182 |
| 5,628,415 | A * | 5/1997 | Mulholland | A47B 47/027 211/186 |
| 5,806,820 | A * | 9/1998 | Simon | H02G 3/263 248/222.52 |
| 5,845,795 | A * | 12/1998 | Mulholland | A47B 47/027 248/221.12 |
| 6,663,204 | B2 * | 12/2003 | Atalla | A47B 96/025 211/153 |
| 7,252,202 | B2 * | 8/2007 | Saltzberg | A47B 57/50 211/187 |
| 8,302,788 | B2 * | 11/2012 | Vargo | A47B 57/50 211/186 |
| D683,983 | S * | 6/2013 | Troyner | D6/675.2 |
| 9,326,604 | B1 * | 5/2016 | Schuldt | A47B 96/021 |
| 9,375,102 | B2 * | 6/2016 | Troyner | A47F 5/01 |
| 9,526,355 | B1 * | 12/2016 | Rollins | A47F 5/0056 |
| 10,149,541 | B2 | 12/2018 | Hanlon | |
| 10,299,594 | B2 * | 5/2019 | Liss | A47B 47/027 |
| 10,806,257 | B1 * | 10/2020 | Liu | A47B 47/024 |
| 11,026,509 | B2 * | 6/2021 | Walker | A47B 47/0083 |
| 11,390,460 | B2 * | 7/2022 | Iellimo | A47B 96/021 |
| 2006/0011568 | A1 | 1/2006 | Remmers et al. | |
| 2007/0175846 | A1 * | 8/2007 | Konstant | A47B 47/021 211/189 |
| 2008/0237168 | A1 * | 10/2008 | Harpole | B65D 19/12 211/195 |
| 2008/0296245 | A1 | 12/2008 | Punzel et al. | |
| 2009/0277854 | A1 * | 11/2009 | Eustace | A47B 57/22 211/183 |
| 2011/0036794 | A1 * | 2/2011 | Schott | A62C 99/00 211/85.3 |
| 2012/0000871 | A1 | 1/2012 | Troyner et al. | |
| 2012/0067838 | A1 * | 3/2012 | Lawson | A47B 47/024 211/183 |
| 2013/0098856 | A1 * | 4/2013 | Troyner | A47B 47/0083 211/183 |
| 2014/0116973 | A1 * | 5/2014 | Buckley | A47F 5/00 29/525.01 |
| 2015/0090683 | A1 * | 4/2015 | Sabounjian | A47B 96/14 211/186 |
| 2015/0359335 | A1 * | 12/2015 | Offerman | A47B 96/02 211/153 |
| 2018/0344031 | A1 * | 12/2018 | Wang | B25H 3/04 |
| 2019/0290000 | A1 | 9/2019 | Davis et al. | |
| 2022/0079338 | A1 * | 3/2022 | Hanlon | A47B 47/0083 |
| 2023/0077206 | A1 * | 3/2023 | Di Biase | B62D 53/0864 |
| 2023/0270248 | A1 * | 8/2023 | Hanlon | A47B 47/0083 211/187 |
| 2023/0398678 | A1 * | 12/2023 | Hanlon | B25H 3/04 |

FOREIGN PATENT DOCUMENTS

| | | |
|---|---|---|
| CN | 105286303 A | 2/2016 |
| CN | 205233887 U | 5/2016 |
| CN | 106175134 A | 12/2016 |
| CN | 208054213 U | 11/2018 |
| CN | 209058434 U | 7/2019 |
| EP | 0273345 A2 | 7/1988 |

* cited by examiner

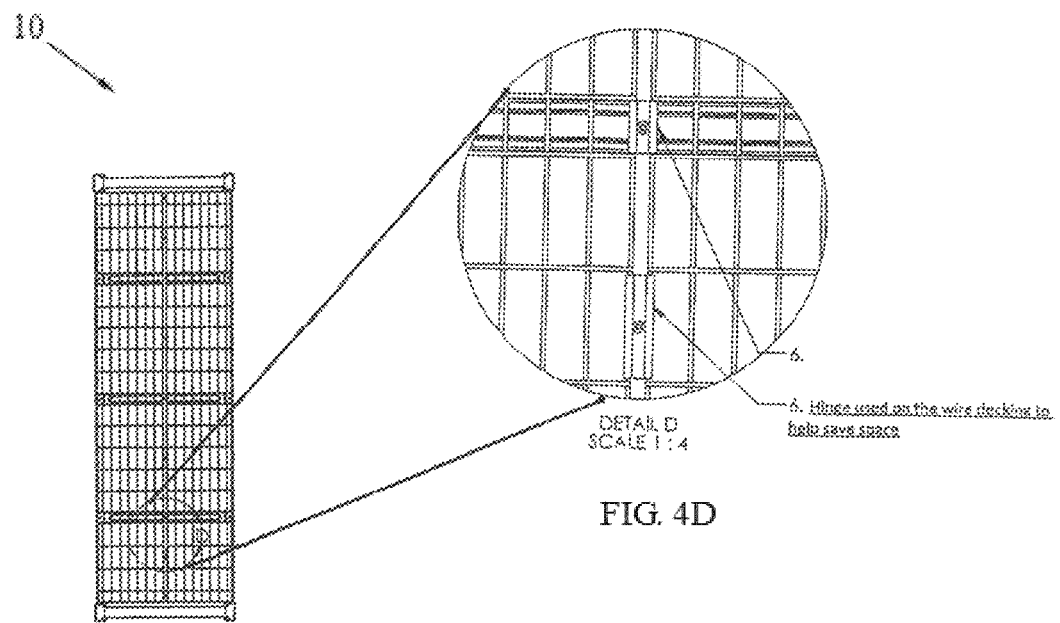
FIG. 4
FIG. 4D
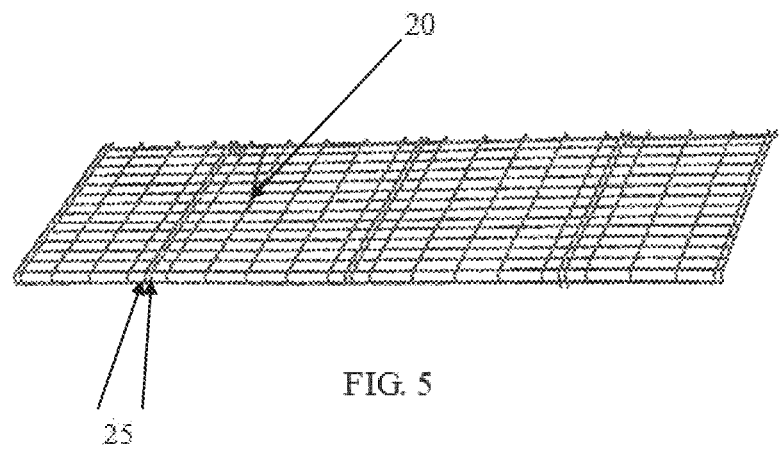
FIG. 5

DETAIL E
SCALE 1 : 3

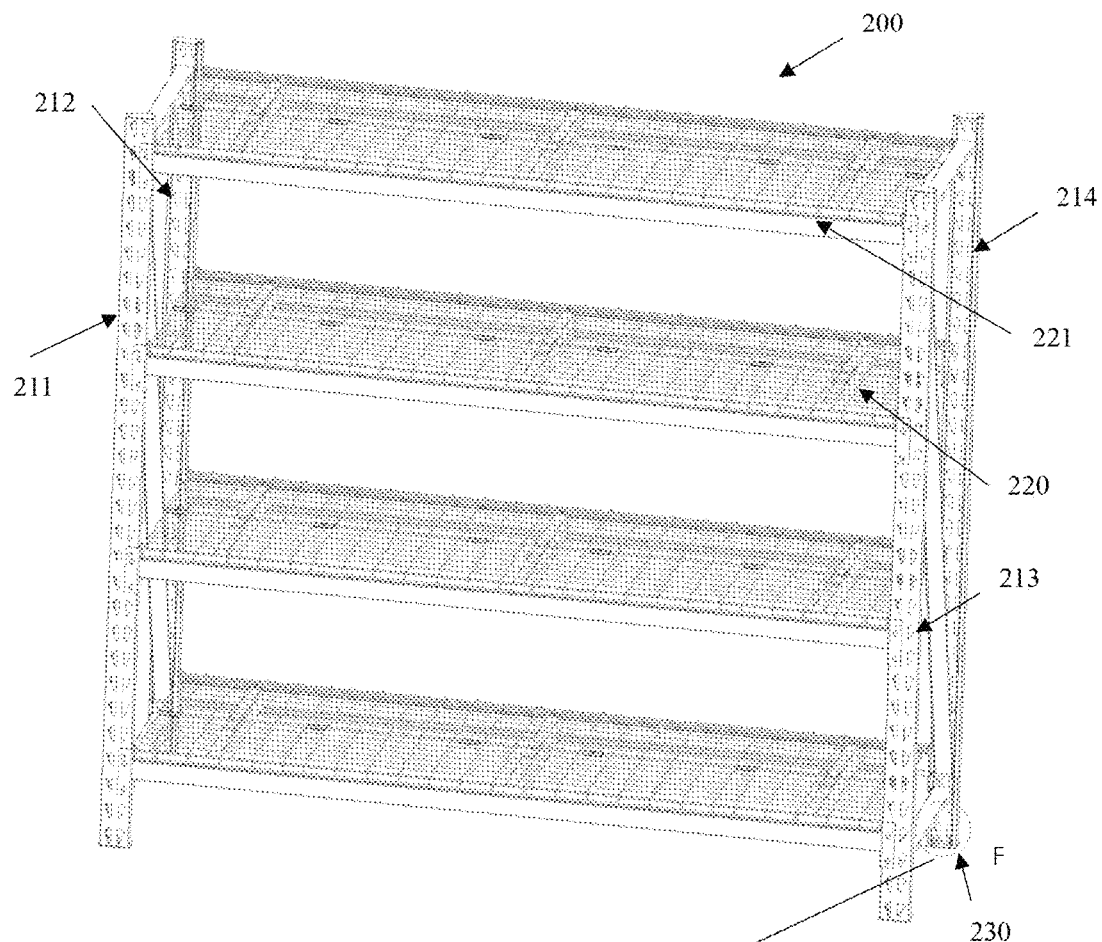
FIG. 18A
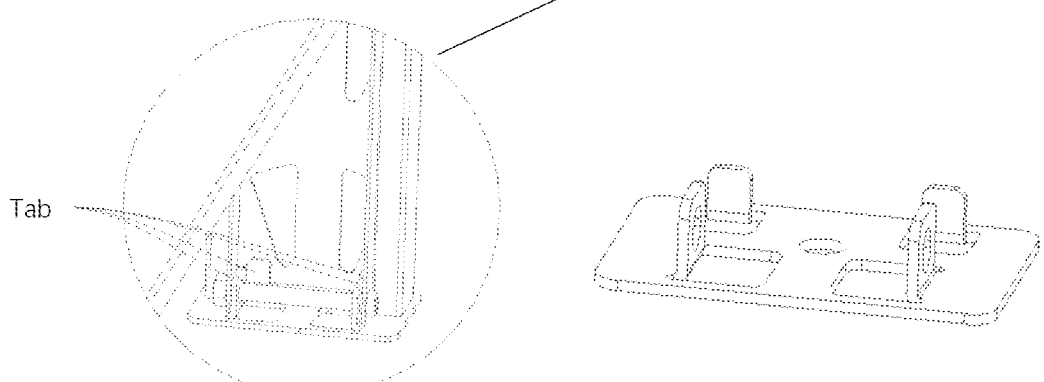
DETAIL F
SCALE 1 : 4.5
FIG. 18B
FIG. 18C

INDUSTRIAL RACK

FIELD OF THE INVENTION

The present invention relates to a structural support device, and more particularly to an industrial rack apparatus and an industrial racking system including the rack apparatus.

DESCRIPTION OF THE PRIOR ART

Shelving or rack systems are useful for a variety of applications, such as providing a support structure on which to store a variety of items. There is a need for an improved industrial rack system.

SUMMARY OF THE INVENTION

One object of the present invention is to provide an improved industrial racking system. The improved industrial racking system comprises an industrial rack apparatus comprising:
  upright support members;
  at least one pair of shelf beams that are supported by the upright support member;
  at least one shelf connected to one pair of the at least a pair of shelf beams;
  wherein one pair of the upright support members is positioned at one end of the rack apparatus, and the other pair of the upright support member is positioned at the opposite end of the rack apparatus;
  wherein each shelf beam of the at least one shelf beams is attached to two opposed upright members of the upright support members.

Preferably, each shelf of the at least one shelf is comprised of wire decking that is connected to one pair of the at least one pair of shelf beams poisoned at opposite sides of the wire decking.

Preferably, each shelf beam of the at least one pair of shelf beams comprises a "C" channel engaging the wire decking.

Preferably, the "C" channel is located approximately a top third of the shelf beam.

Preferably, the "C" channel is set back into the shelf beam.

Preferably, the wire decking comprises two strips of wire on inside and outside of the wire decking, and one of the strips of wire inside facilitate locking the wire decking into the shelf beam.

Preferably, each shelf beam of the at least one pair of shelf beams comprises a cross channel attached to the shelf beam and used for supporting the wire decking.

Preferably, the shelf beam comprises a drop-down channel that allows the wire decking to make contact with the shelf beam.

Preferably, the wire decking is foldable.

Preferably, a hole is formed in center of the drop-down channel that allows a weld nut that is applied to the wire decking to fir into the wire decking and keep the wire decking from shifting from side to side.

Preferably, a hinge makes contact with the wire decking and prevents the wire decking shifting from side to side.

Preferably, the rack apparatus comprises a detachable mounting foot removably attached at base of each of the upright members.

Preferably, the foot has internal bent up tabs that locate off of corresponding one of the upright members.

Preferably, an extended wire formed locking tabs can be inserted into frame of the wire decking.

Preferably, the industrial rack apparatus is made of all steel construction.

Preferably, the industrial rack apparatus comprises at least one square tube located underneath each of the at least one shelf, which is attached to the opposed shelf beams.

Preferably, one end of the square tube is preassembled to one of the shelf beams, and another end of the square tube can be rotated relative the one of the shelf beams.

Preferably, the one of the shelf beams comprises a channel inserted into a hole of the one of the shelf beams, and the square tube can be concealed in the channel for packaging/delivery.

Preferably, the industrial rack apparatus comprises at least one support bar, one end of which is attached proximate upper edge of one of the upright members and extends at a slant to attach proximate lower edge of another of the upright members.

Preferably, the at least one support bar comprises a first support bar and a second support bar which are opposed.

Another embodiment of the invention is to provide an industrial racking system with enhanced strength and stability. The industrial racking system comprises an industrial rack apparatus comprising: upright support members, at least one pair of shelf beams that are supported by the upright support member, at least one shelf connected to one pair of the at least a pair of shelf beams, wherein one pair of the upright support members is positioned at one end of the rack apparatus, and the other pair of the upright support member is positioned at the opposite end of the rack apparatus, wherein each shelf beam of the at least one shelf beams is attached to two opposed upright members of the upright support members.

These and other objects of the invention can be achieved in one or more embodiments of the invention described herein.

One embodiment of the invention comprises a rack apparatus comprising: upright support members, at least one pair of shelf beams that are supported by the upright support member, at least one shelf connected to one pair of the at least a pair of shelf beams, wherein one pair of the upright support members is positioned at one end of the rack apparatus, and the other pair of the upright support member is positioned at the opposite end of the rack apparatus, wherein each shelf beam of the at least one shelf beams is attached to two opposed upright members of the upright support members.

Another embodiment of the invention comprises a method of making a rack apparatus, comprising the following steps:
  providing four upright support members, wherein one pair of the upright support members is positioned at one end of the rack apparatus, and the other pair of the upright support member is positioned at the opposite end of the rack apparatus;
  providing at least one pair of shelf beams;
  attaching each shelf beam of the at least one shelf beams to two opposed upright members of the upright support members;
  providing at least one shelf, and connecting the shelf to one pair of the at least a pair of shelf beams.

BRIEF DESCRIPTION OF THE DRAWINGS

FIG. 4 is a top plan view of the rack apparatus of FIG. 1;

FIG. 4D is a partial enlarged view of the rack apparatus taken from section D of FIG. 4; and FIG. 5 is a partial perspective view of the rack apparatus of FIG. 1;

FIG. 18A is a perspective view of a rack apparatus according to another embodiment of the invention;

FIG. 18B is a partial enlarged view of the rack apparatus taken from section F of FIG. 18A; and FIG. 18C is a perspective view of foot of FIG. 18A.

DETAILED DESCRIPTION OF THE PREFERRED EMBODIMENTS

Figures 1, 2, 3:
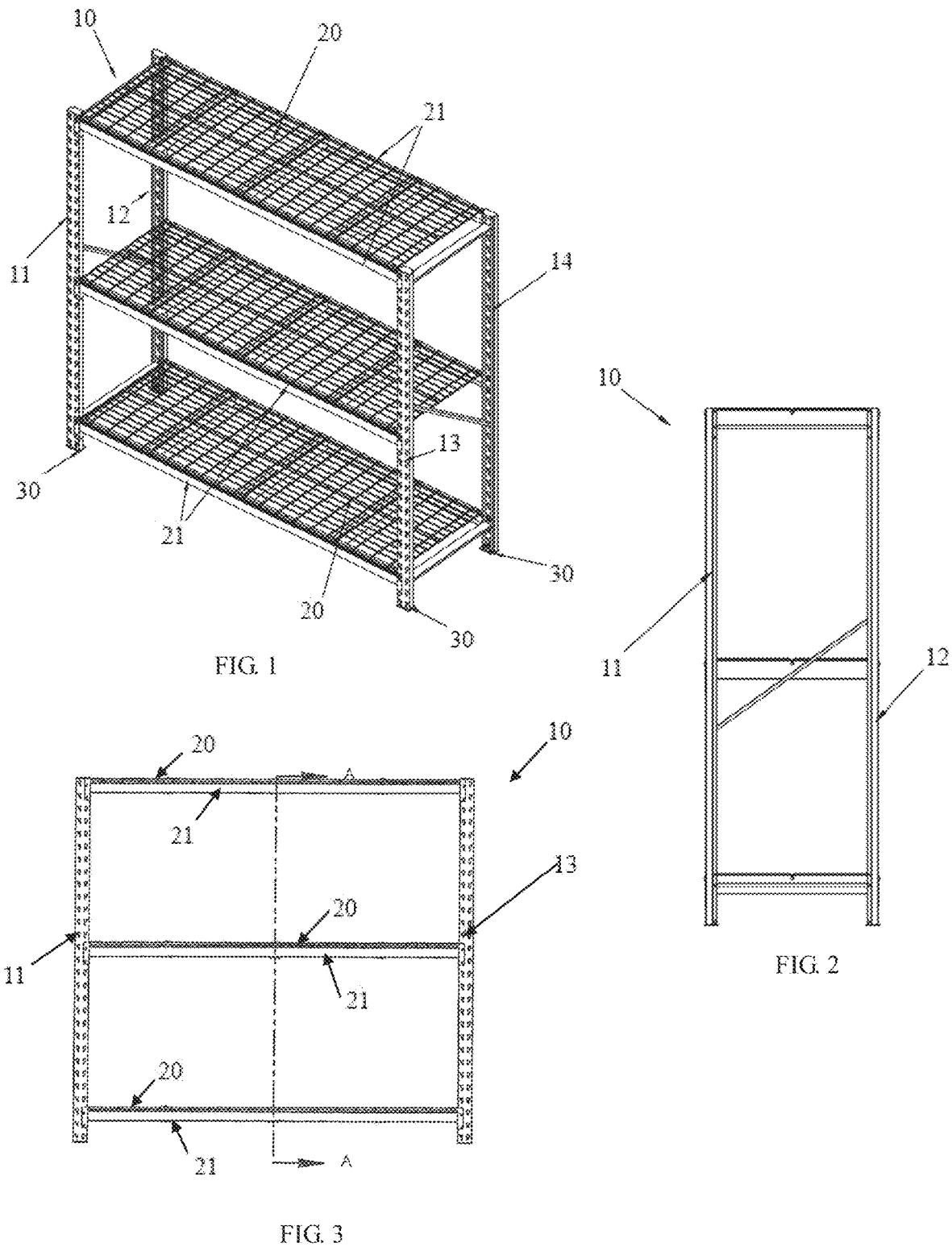
FIG. 1 is perspective view of a rack apparatus according to a preferred embodiment of the invention.
FIG. 2 is a side elevation of the rack apparatus of FIG. 1.
FIG. 3 is a front elevation of the rack apparatus of FIG. 1.

An industrial rack apparatus according to a preferred embodiment of the invention is illustrated in FIGS. 1-4D and 17A-17B, and shown generally at reference numeral 10. The rack apparatus 10 comprises a plurality of shelves 20 connected to shelf beams 21 that are supported by four upright support members 11, 12, 13, 14. One pair of upright members 11, 12 is positioned at one end of the apparatus 10, and the other pair of upright members 13, 14 is positioned at the opposite end of the apparatus 10, as shown in FIG. 1.

Each shelf 20 is comprised of waterfall wire decking that is connected to a pair of shelf beams 21 positioned at opposite sides of the wire decking 20. Each shelf beam 21 is attached to two opposed upright members-either upright members 11 and 13 or upright members 12 and 14.

Figures 3A, 3B, 3C:
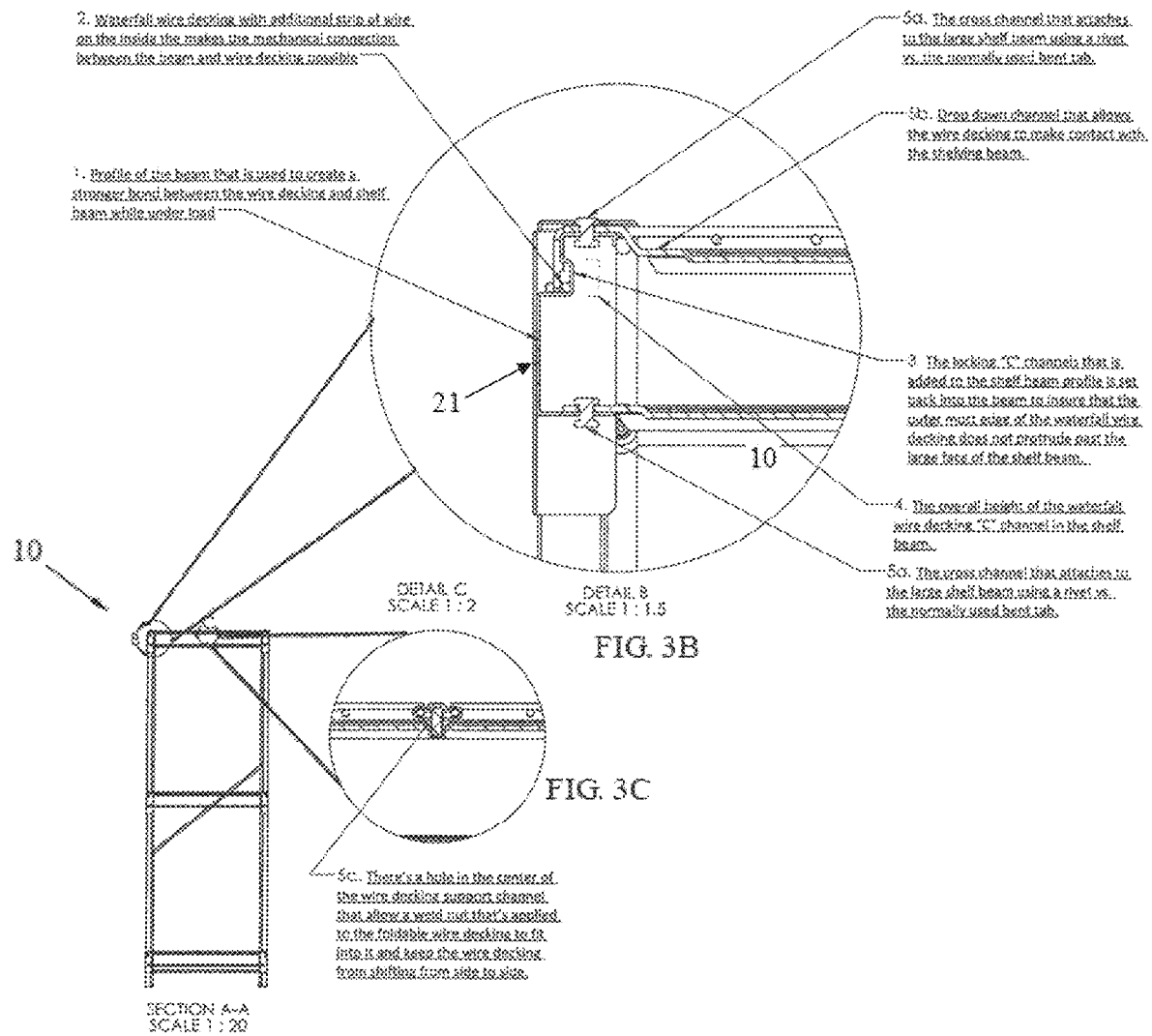
FIG. 3A is a cross sectional view of the rack apparatus taken along lines A-A of FIG. 3.
FIG. 3B is a partial enlarged view of the rack apparatus taken from section B of FIG. 3A.
FIG. 3C is a partial enlarged view of the rack apparatus taken from section C of FIG. 3A.

Each shelf beam 21 has a cross sectional profile shown at reference numeral 1 in FIG. 3B. A locking "C" channel is located approximately a the top third of the beam 21 and is shown generally at reference numeral 3 in FIG. 3B. The "C" channel 3 of the shelf beam 21 engages the wire decking 20 and creates a strong bond between the wire decking 20 and the shelf beam 21 while under load. The channel 3 in the beam 21 makes contact and creates a mechanical bond when the shelf is under load. As such, the thickness of the shelf beam 21, and wire decking cross support can be made of lighter material. The load applied to the shelf 20 is more evenly distributed over the entire beam 21 rather than one point specifically.

Figure 17B:
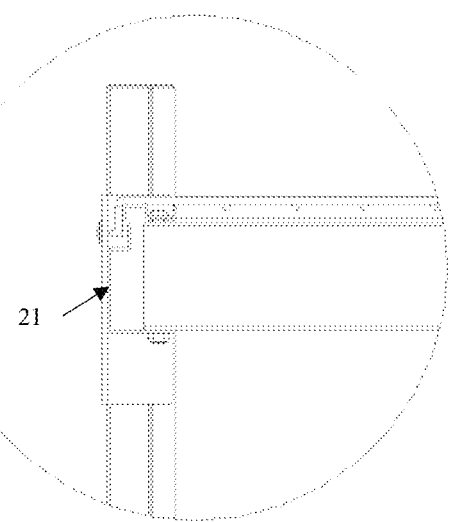
FIG. 17B is a partial enlarged view of the rack apparatus taken from section E of FIG. 17A.
Figure 17A:
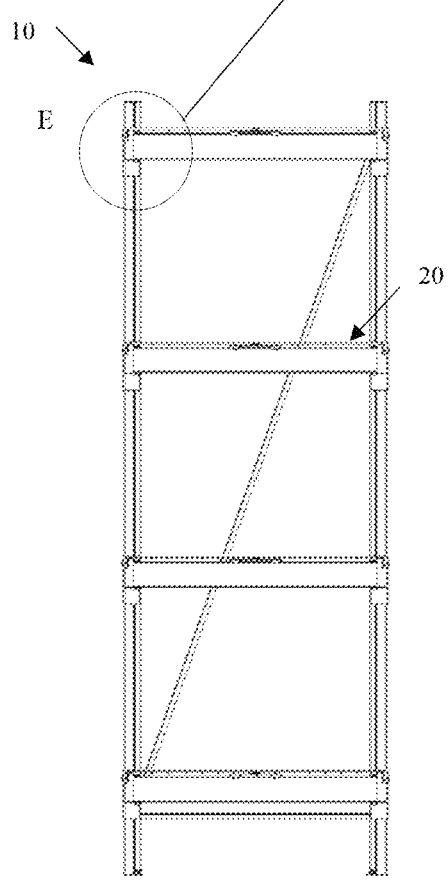
FIG. 17A is a side elevation of a rack apparatus according to another embodiment of the invention.

As shown in FIGS. 3B and 17B, the waterfall wire decking 20 includes an additional strip of wire on the inside facilitating the mechanical connection between the beam 21 and wire decking 20. Conventional waterfall wire decking has a single wire strip applied to the outer most edge to protect the end user from potential injury. The waterfall wire decking 20 of the rack apparatus 10 includes strips of wire 2 on both sides (inside and outside). The outside strip protects the customer and the inside strip facilitates locking the wire decking 20 into the shelf beam 21.

The locking "C" channel 3 of the shelf beam profile 1 is set back into the beam 21 so that the outer most edge of the waterfall wire decking 20 does not protrude past the large face of the shelf beam 21. The setback in the beam 21 protects the customer against injury.

The overall height of the "C" channel 3, shown at reference numeral 4 in FIG. 3B, allows the beam 21 and wire decking 20 to flex while under load and still stay engaged into the beam 21. The shelf beam 21 and the wire decking 20 flex at different rates. As such, there must be a certain amount of clearance to allow the flexing to take place.

As shown in FIG. 3B, a cross channel supports the wire decking 20. The cross channel can be attached to the shelf beam 21 using a rivet 5a, which allows the rack frame to flex to a point, and the wire decking support channels do not pop up giving the overall structure more strength. As shown in FIG. 3B, the beam 21 includes a drop-down channel 5b that allows the wire decking 20 to make contact with the shelving beam 21.

As shown in FIG. 3C, a hole 5c is formed in the center of the wire decking support channel that allows a weld nut that is applied to the foldable wire decking 20 to fit into the decking 20 and keep the wire decking 20 from shifting from side to side. This is particularly helpful in preventing unwanted shifting of the wire decking 20 when large and heavy objects are slid from side to side.

As shown in FIG. 4D, a hinge 6 makes contact with the wire decking 20 and prevents the grid from shifting from side to side, keeping the decking 20 square. The hinge 6 helps save space.

The rack apparatus 10 can include a detachable mounting foot 30 removably attached at the base of each upright member 11, 12, 13, 14. Each foot 30 has internal bent up tabs that locate off of the upright member, and can be mounted to the floor and then have the rack applied. Preferably, the material used for the foot 30 is more than twice the thickness of each formed upright 11, 12, 13, 14.

As shown in FIG. 5, extended wire formed locking tabs 25 can be inserted into the frame of the deck 20, which helps keep the deck 20 in place. According to another embodiment, the tabs 25 can be made into a loop through which a bolt can be positioned, which allows for elimination of a deck support in the event a single wire deck construction is used rather than a hinged/folding wire deck.

Preferably, the rack apparatus is made of all steel construction. The rack apparatus 10 is further described in the attached appendix, which is incorporated herein.

Figure 6:
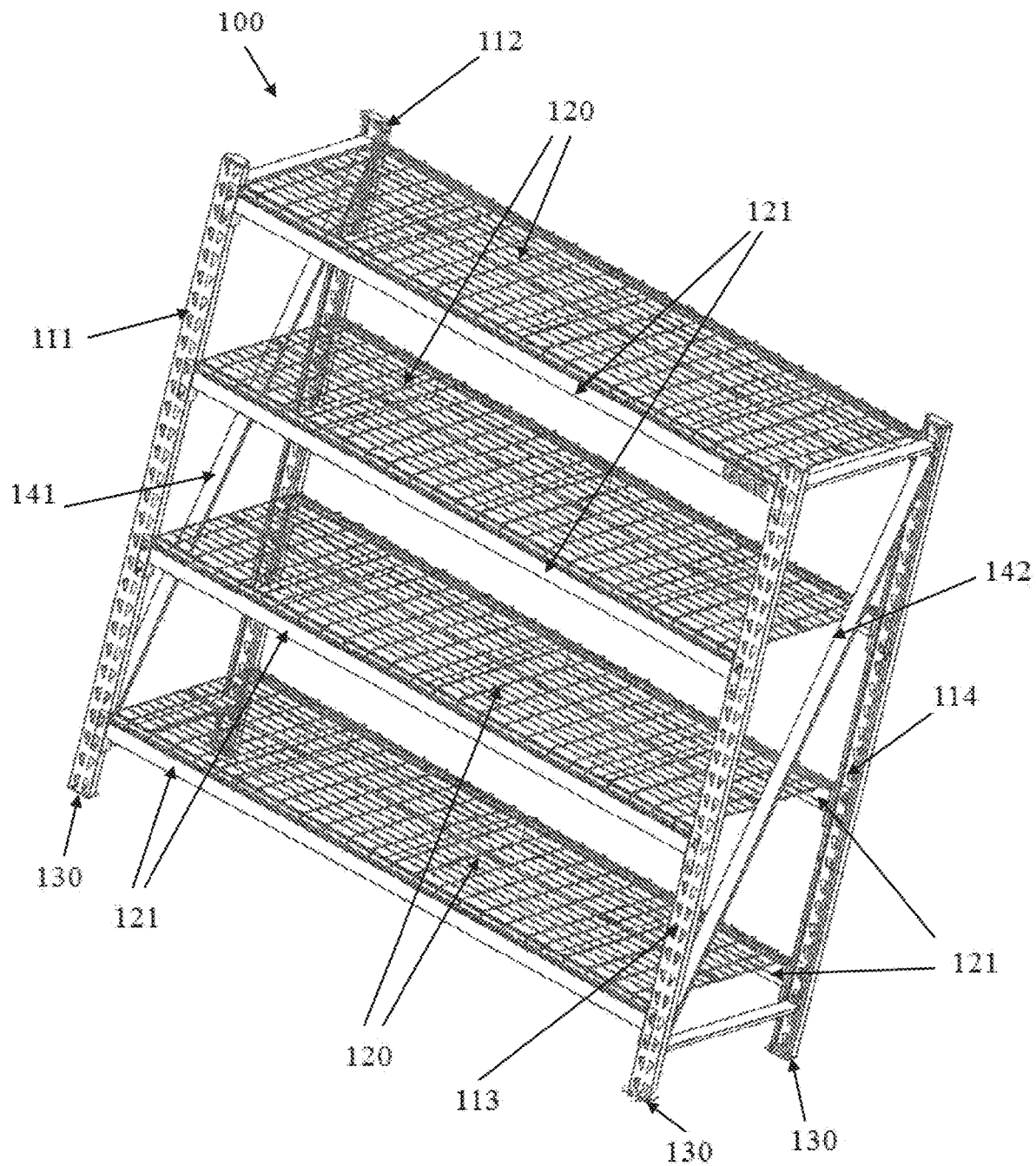
FIG. 6 is a perspective view of a rack apparatus according to another embodiment of the invention.

A rack apparatus according to another preferred embodiment of the invention is illustrated in FIGS. 6-13 and shown generally at reference numeral 100. Preferably, the rack apparatus 100 has dimensions of seventy-seven inches by twenty-four inches by seventy-two inches. The rack apparatus 100 comprises a plurality of shelves 120 connected to shelf beams 121 that are supported by four upright support members 111, 112, 113, 114. One pair of upright members 111, 112 is positioned at one end of the apparatus 100, and the other pair of upright members 113, 114 is positioned at the opposite end of the apparatus 100, as shown in FIG. 6.

Each shelf 120 is comprised of waterfall wire decking that is connected to a pair of shelf beams 121 positioned at opposite sides of the wire decking 120. Each shelf beam 121 is attached to two opposed upright members-either upright members 111 and 113 or upright members 112 and 114.

Figure 7:
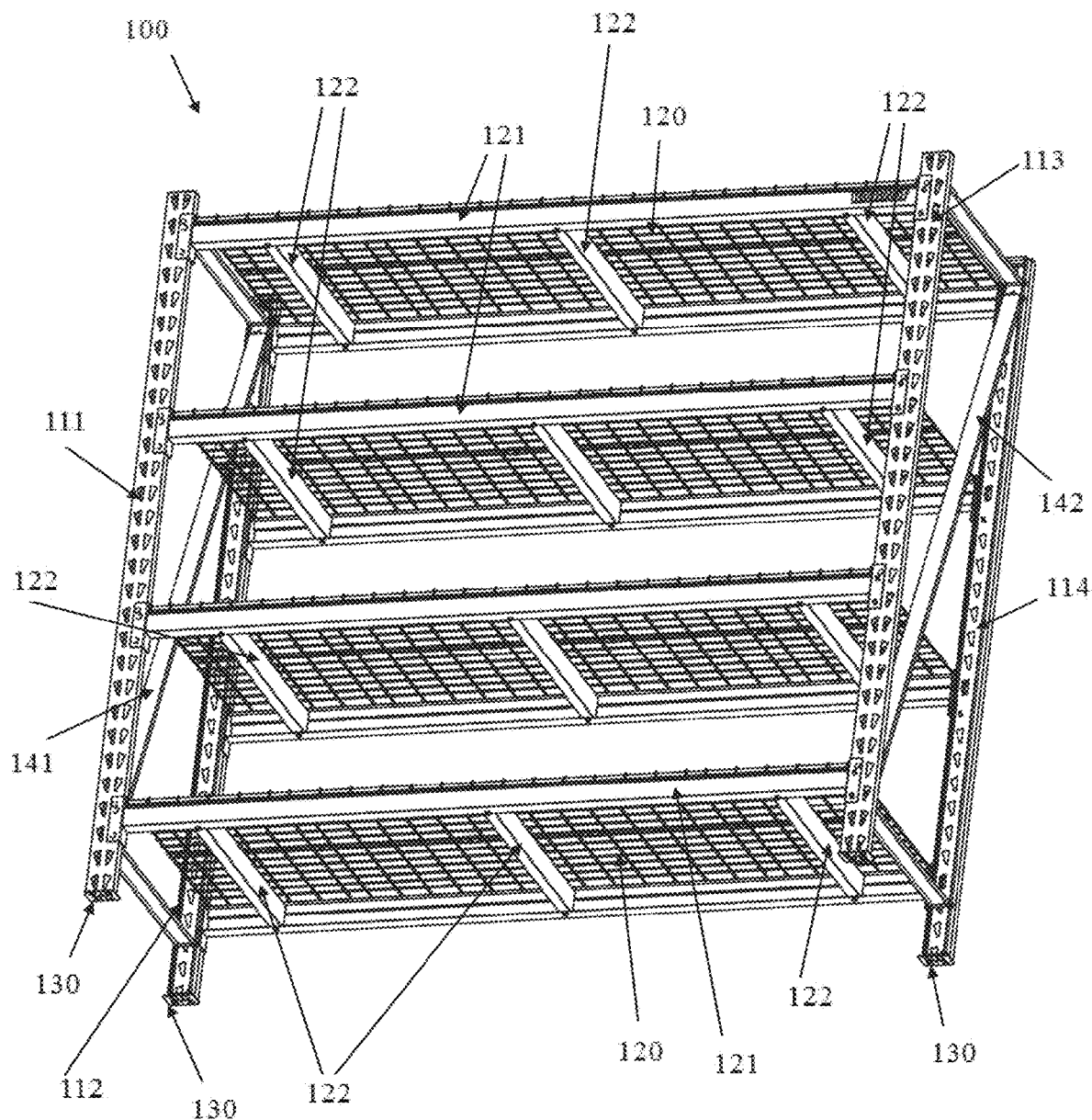
FIG. 7 is another perspective view of the rack apparatus of FIG. 6.
Figure 8:
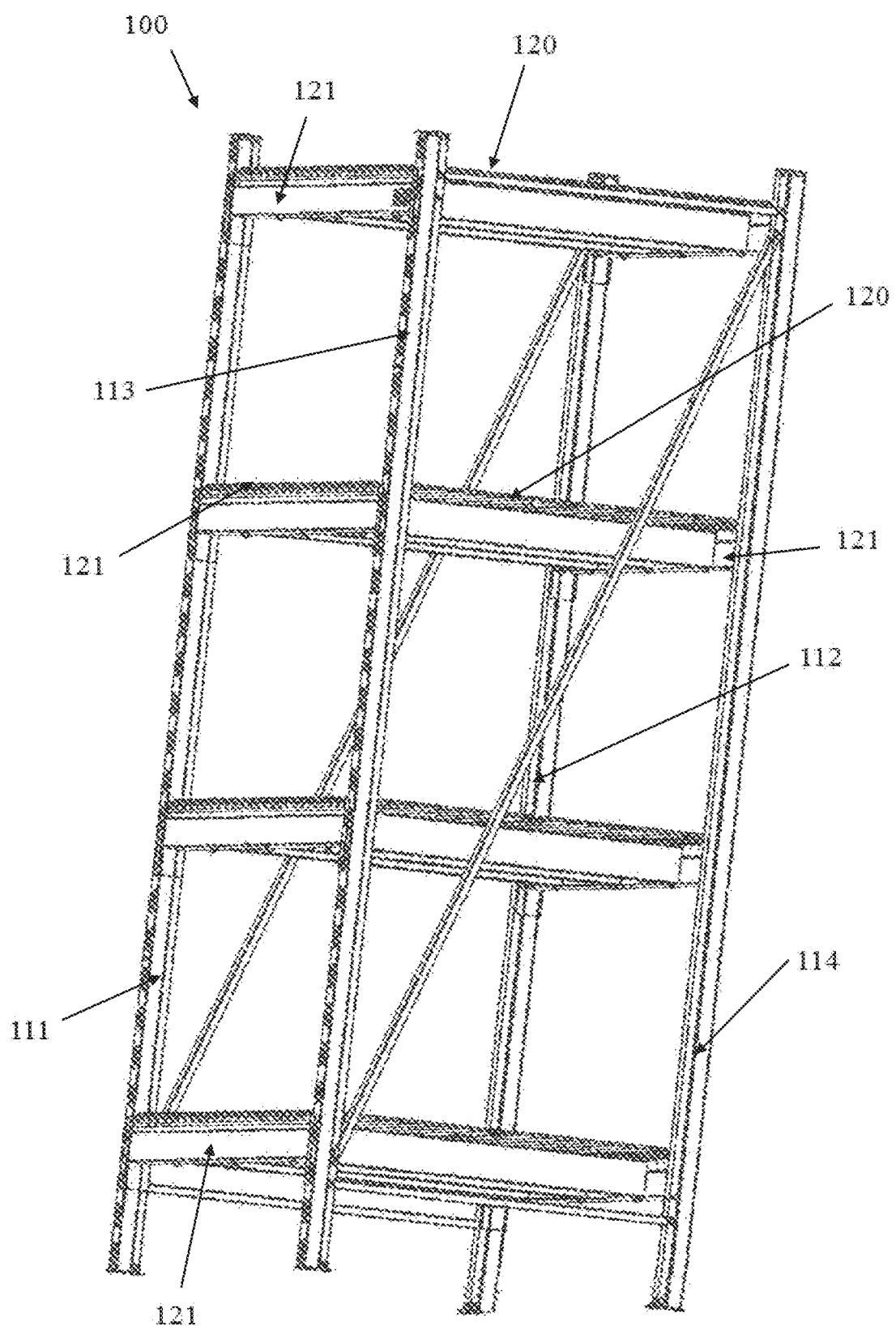
FIG. 8 is another perspective view of the rack apparatus of FIG. 6.
Figure 9:
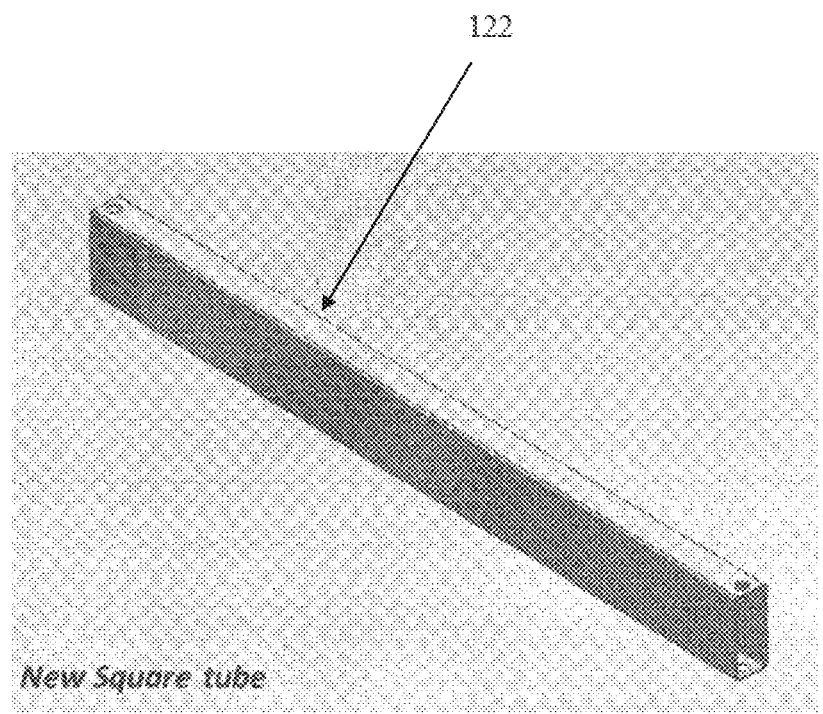
FIG. 9 is a perspective view of a component of the rack apparatus of FIG. 6.
Figure 10:
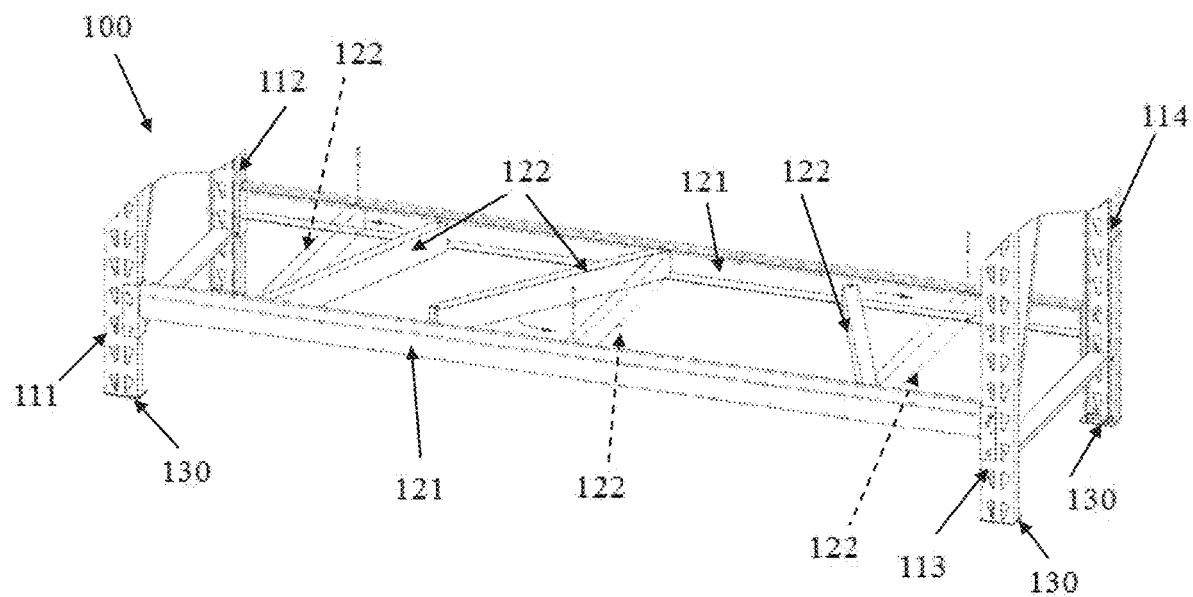
FIG. 10 is a partial perspective view of the rack apparatus of FIG. 6.
Figure 10A:
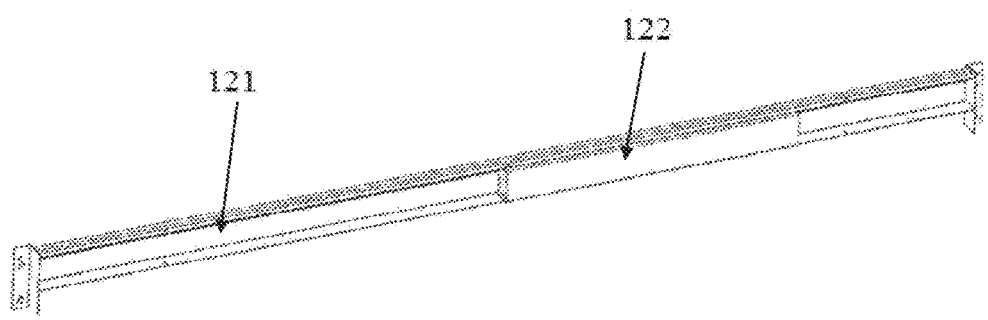
FIG. 10A is a perspective view of a component of the rack apparatus of FIG. 6.

As shown in FIG. 7, three square tubes 122 are positioned underneath each shelf 120 and are attached to opposed shelf beams 121 to stabilize the beams 121. A detailed view of the square tube 122 is shown in FIG. 9. One end of the square tube 122 can be preassembled to the long shelf beam 121 with bolt and nut, as shown in FIGS. 10 and 10A. When assembling, the end of the square tube that has not been preassembled to a shelf beam 121 is pulled out and attached to the opposite beam 121 with bolt and nut, as shown in FIG. 10. To facilitate insertion of the bolt through into the beam 121, a plastic channel can be inserted into a hole in the beam 121. As shown in FIG. 10A, the square tube 122 can be concealed in the beam 121 for packaging/delivery to reduce packaging size and delivery costs.

The apparatus 100 includes a pair of support bars 141, 142. One end of the first support bar 141 is attached proximate the upper edge of the upright beam 112 and extends at a slant to attach proximate the lower edge of upright beam 111. One end of the second support bar 142 is attached proximate the upper edge of upright beam 114 and extends at a slant to attach proximate the lower edge of upright beam 113.

Figure 11:
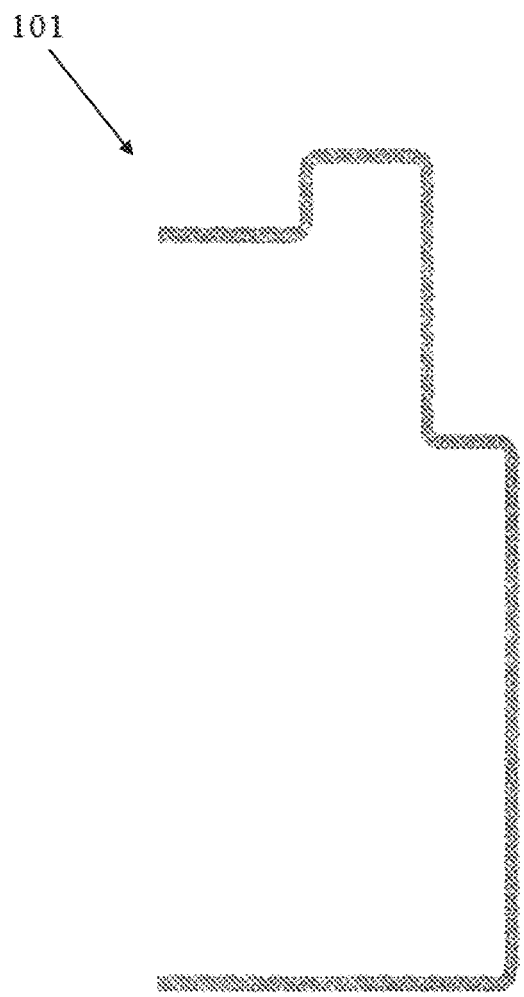
FIG. 11 is a cross sectional view of a shelf beam of the rack apparatus of FIG. 6.
Figure 12:
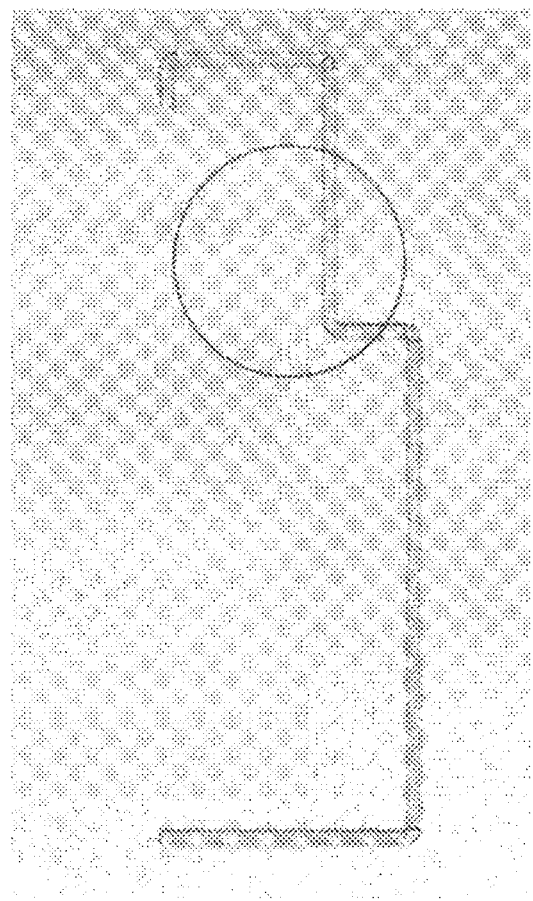
FIG. 12 is a cross sectional view of a shelf beam of a rack apparatus according to another embodiment of the invention.
Figure 13:
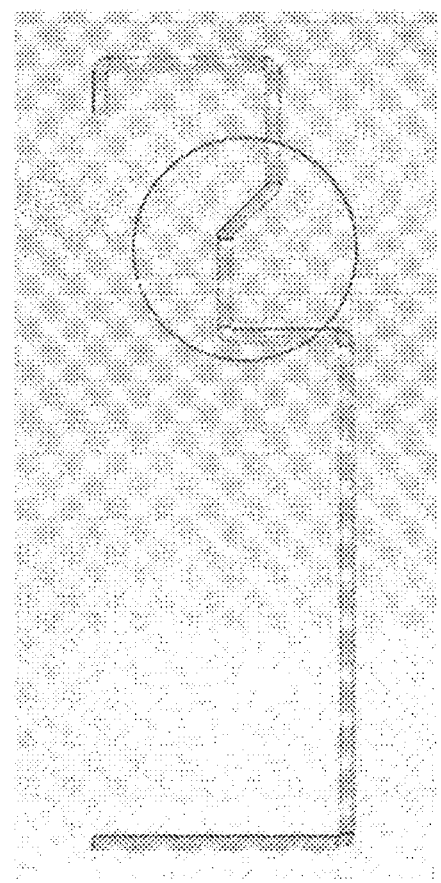
FIG. 13 is a cross sectional view of a shelf beam of a rack apparatus according to another embodiment of the invention.

In a preferred embodiment, each shelf beam 121 has a cross sectional profile as shown at reference numeral 101 in FIG. 11. The beam profile 101 provides space to receive the square tube 122 and is more capable to bear the deformation. The beam profile 101 also provides improved strength and simplifies the rolling process. In an alternative embodiment, each shelf beam 121 can have a cross sectional profile as shown at reference numeral 102 in FIG. 12. In another embodiment, each shelf beam 121 can have a cross sectional profile as shown at reference numeral 103 in FIG. 13.

The rack apparatus 100 can include a detachable mounting foot 130 removably attached at the base of each upright member 111, 112, 113, 114. Each foot 130 has internal bent up tabs that locate off of the upright member and can be mounted to the floor and then have the rack applied.

Figure 14:
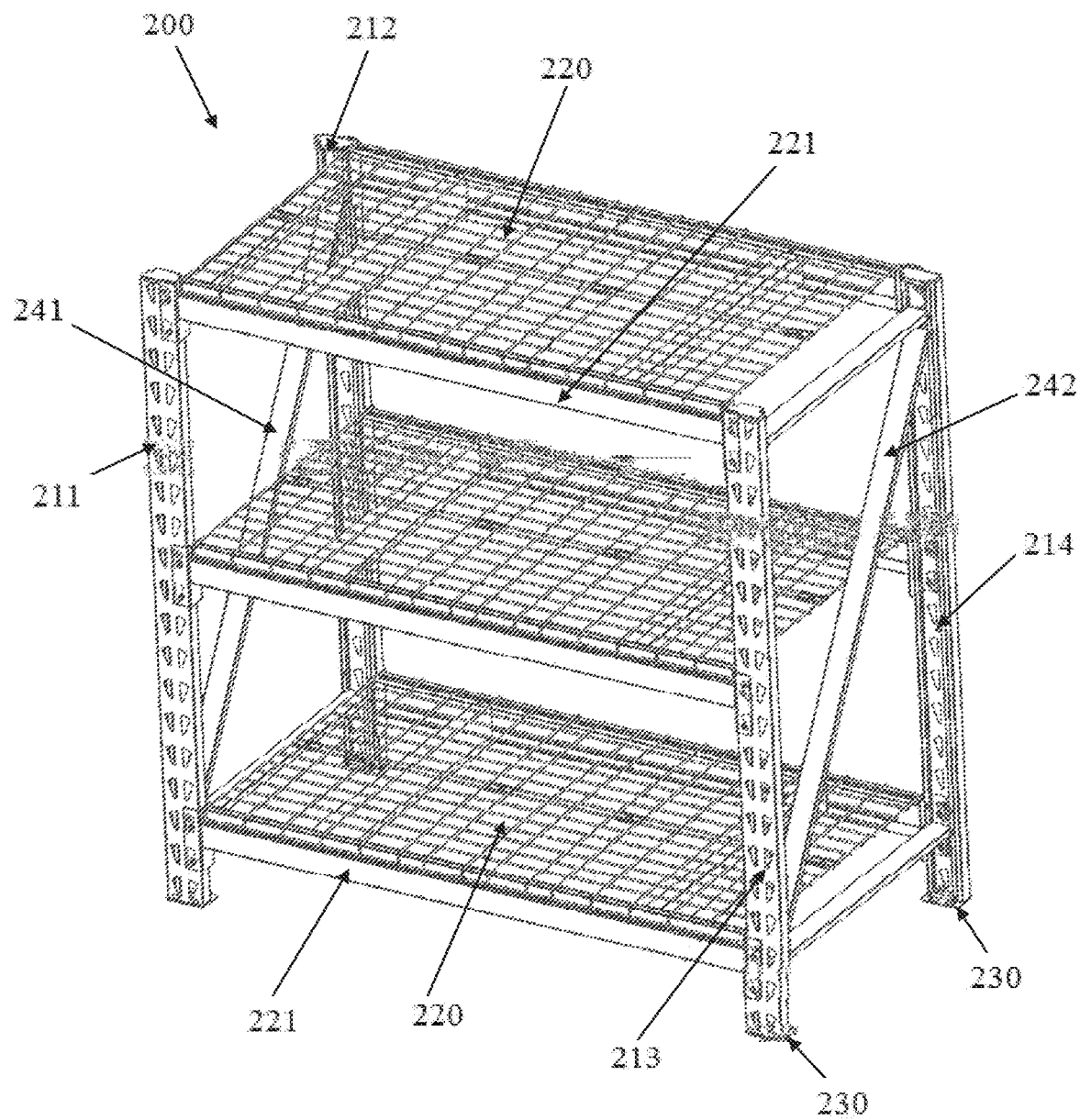
FIG. 14 is a perspective view of a rack apparatus according to another embodiment of the invention.

A rack apparatus according to another preferred embodiment of the invention is illustrated in FIGS. 14-16 and 18A-18C, and shown generally at reference numeral 200. The apparatus 200 is similar in structure to the previously described apparatus 10, except that the apparatus 200 has dimensions of forty-eight inches by twenty-four inches by forty-seven inches. The rack apparatus 200 comprises a plurality of shelves 220 connected to shelf beams 221 that are supported by four upright support members 211, 212, 213, 214. One pair of upright members 211, 212 is positioned at one end of the apparatus 100, and the other pair of upright members 213, 214 is positioned at the opposite end of the apparatus 200, as shown in FIG. 14.

Each shelf 220 is comprised of waterfall wire decking that is connected to a pair of shelf beams 221 positioned at opposite sides of the wire decking 120. Each shelf beam 221 is attached to two opposed upright members-either upright members 211 and 213 or upright members 212 and 214.

Figure 15:
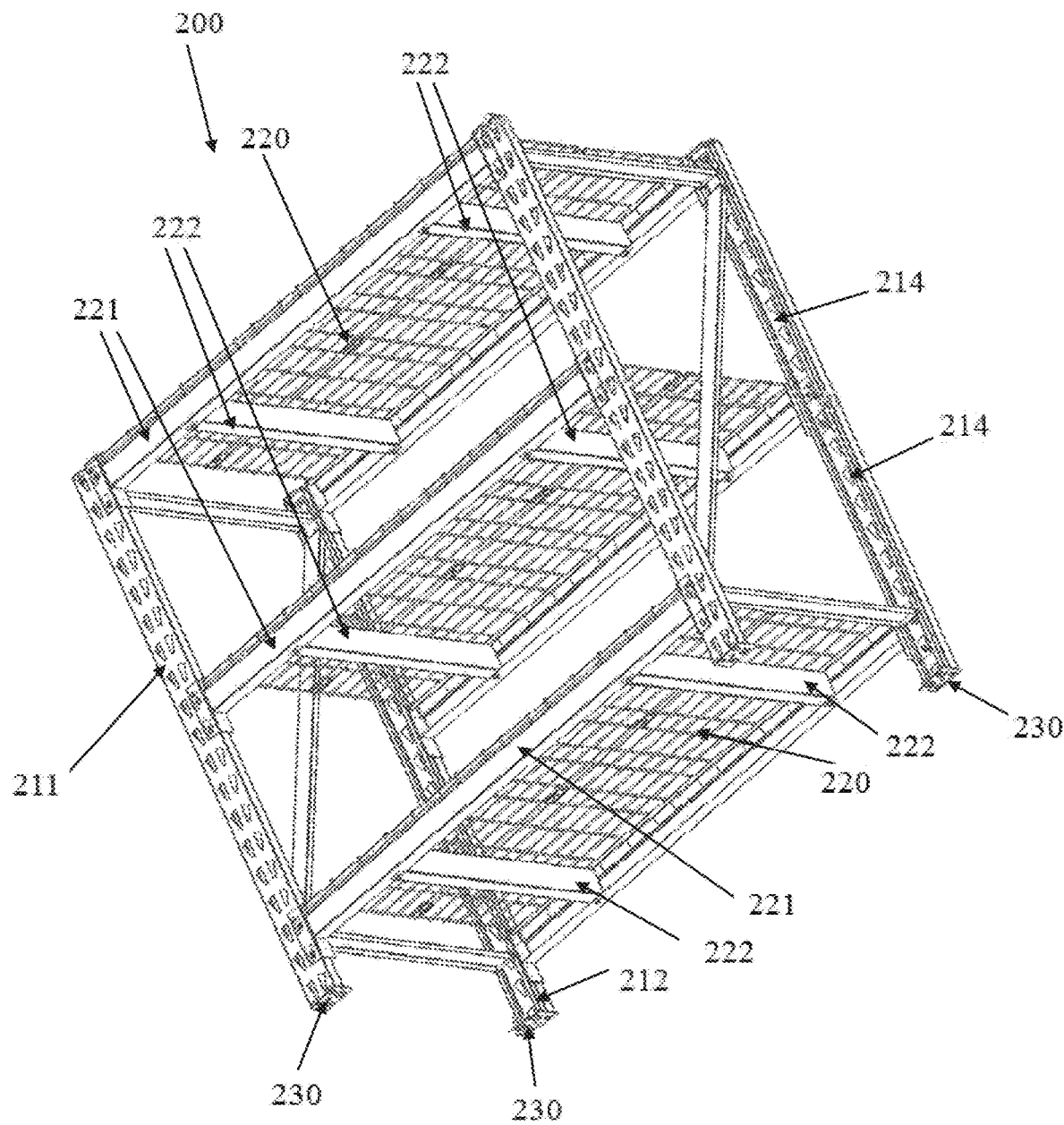
FIG. 15 is another perspective view of the rack apparatus of FIG. 12.
Figure 16:
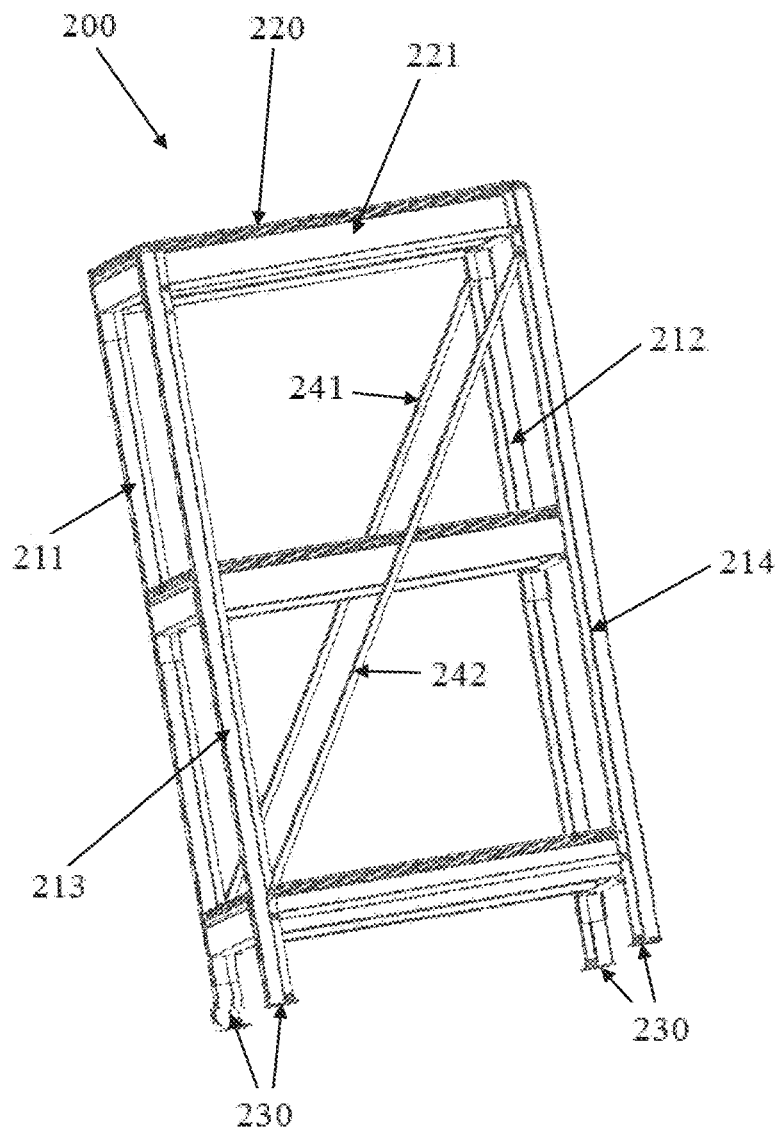
FIG. 16 is another perspective view of the rack apparatus of FIG. 12.

As shown in FIG. 15, two square tubes 222 are positioned underneath each shelf 120 and are attached to opposed shelf beams 221 to stabilize the beams 121. The apparatus 200 can include a pair of support bars 241, 242. One end of the first support bar 241 is attached proximate the upper edge of the upright beam 212 and extends at a slant to attach proximate the lower edge of upright beam 211. One end of the second support bar 242 is attached proximate the upper edge of upright beam 214 and extends at a slant to attach proximate the lower edge of upright beam 213.

In a preferred embodiment, each shelf beam 221 has a cross sectional profile as shown at reference numeral 101 in FIG. 11. The beam profile 101 provides space to receive the square tube 222 and is more capable to bear deformation. The beam profile 101 also provides improved strength and simplifies the rolling process. Alternatively, each shelf beam 221 can have a cross sectional profile as shown at reference numeral 102 in FIG. 12 or reference numeral 103 in FIG. 13.

The rack apparatus 200 can include a detachable mounting foot 230 (as shown in FIGS. 18A-18C) removably attached at the base of each upright member 211, 212, 213, 214. Each foot 230 has internal bent up tabs that locate off of the upright member, and can be mounted to the floor and then have the rack applied.

A rack apparatus and method of making same are described above. Various changes can be made to the invention without departing from its scope. The above description of embodiments and best mode of the invention are provided for the purpose of illustration only and not limitation.

The invention claimed is:

1. An industrial rack apparatus, comprising:
   upright support members;
   at least one pair of shelf beams that are supported by the upright support members;
   at least one shelf connected to one pair of the at least a pair of shelf beams;
   wherein one pair of the upright support members is positioned at one end of the rack apparatus, and another pair of the upright support member is positioned at an opposite end of the rack apparatus;
   wherein each shelf beam of the at least one pair of shelf beams is attached to two opposed upright members of the upright support members;
   wherein each shelf beam of the at least one pair of shelf beams comprises an upper beam and a lower beam, the upper beam is fixedly connected to the lower beam, a width of the upper beam extending from a first inner end to a first outer end is smaller than a width of the lower beam extending from a second inner end to a second outer end, and the first inner end of the upper beam is aligned with the second inner end of the lower beam in a vertical direction;
   wherein the at least one shelf comprises a wire decking, the wire decking comprises a main body, a first side and a second side, the first side and the second side are located on opposite sides of the main body and extend in the same direction;
   wherein the wire decking is directly connected to the upper beams of the at least one pair of shelf beams, and the first side and the second side of the wire decking are in direct contact with outer surfaces of the first outer ends of the upper beams.

2. The industrial rack apparatus according to claim 1, wherein each outer surface of the first outer ends of the upper beam is provided with a "C" shaped channel.

3. The industrial rack apparatus according to claim 2, wherein the "C" shaped channel is located at a lower position of the upper beam.

4. The industrial rack apparatus according to claim 2, wherein an end of the first side and the second side of the wire decking comprises a first wire at an inner side of the end and a second wire at an outer side of the end, and the first wire is configured to be accommodated in the "C" shaped channel to lock the wire decking into the at least one pair of shelf beams.

5. The industrial rack apparatus according to claim 1, wherein an upper surface of each shelf beam of the at least one pair of shelf beams is provided with a hole, and a rivet is arranged in the hole, thereby fixing the wire decking to the at least one pair of shelf beams.

6. The industrial rack apparatus according to claim 1, wherein an upper surface of each shelf beam of the at least one pair of shelf beams is provided with.

7. The industrial rack apparatus according to claim 6, wherein the wire decking is foldable.

8. The industrial rack apparatus according to claim 7, wherein a hinge makes contact with the wire decking and prevents the wire decking shifting from side to side.

9. The industrial rack apparatus according to claim 1, wherein the rack apparatus comprises a detachable mounting foot removably attached at a base of each of the upright members.

10. The industrial rack apparatus according to claim 9, wherein the foot has internal bent up tabs that locate off of a corresponding one of the upright members.

11. The industrial rack apparatus according to claim 1, wherein the industrial rack apparatus is made of all steel construction.

12. The industrial rack apparatus according to claim 1, wherein the industrial rack apparatus comprises at least one square tube located underneath the wire decking, wherein an inner side of each shelf beam of the at least one pair of shelf beams is provided with a channel, and two ends of the at least one square tube are respectively arranged in the channels of the at least one pair of shelf beams, so that the at least one square tube is connected with the at least one pair of shelf beams.

13. The industrial rack apparatus according to claim 12, wherein when one end of the at least one square tube is preassembled to one of the at least one pair of shelf beams, and another end of the at least one square tube is configured to be able to rotate relative the one of the at least one pair of shelf beams.

14. The industrial rack apparatus according to claim 13, wherein the at least one square tube can be concealed in the channel for packaging/delivery.

15. The industrial rack apparatus according to claim 1, wherein the industrial rack apparatus comprises at least one support bar, one end of which is attached proximate upper edge of one of the upright members and extends at a slant to attach proximate lower edge of another of the upright members.

16. The industrial rack apparatus according to claim 15, wherein the at least one support bar comprises a first support bar and a second support bar which are opposed.

\* \* \* \* \*